United States Patent

Mukaiyama

(10) Patent No.: US 9,308,913 B2
(45) Date of Patent: Apr. 12, 2016

(54) AUTOMATIC PARKING SYSTEM

(71) Applicant: TOYOTA JIDOSHA KABUSHIKI KAISHA, Toyota-shi, Aichi (JP)

(72) Inventor: Yoshio Mukaiyama, Mishima (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/693,206

(22) Filed: Apr. 22, 2015

(65) Prior Publication Data

US 2015/0353080 A1    Dec. 10, 2015

(30) Foreign Application Priority Data

Jun. 6, 2014  (JP) ................. 2014-117296

(51) Int. Cl.
*B60W 30/08* (2012.01)
*B60W 30/06* (2006.01)
*E05B 77/54* (2014.01)
*B62D 15/02* (2006.01)

(52) U.S. Cl.
CPC .............. *B60W 30/06* (2013.01); *B60W 30/08* (2013.01); *B62D 15/025* (2013.01); *E05B 77/54* (2013.01)

(58) Field of Classification Search
USPC ................... 701/2, 23, 41; 180/274
See application file for complete search history.

(56) References Cited

U.S. PATENT DOCUMENTS

2004/0226768 A1* 11/2004 DeLuca ............ B60T 7/042
                                                          180/275
2007/0282499 A1    12/2007 Maeda et al.
2008/0051959 A1*  2/2008  Ishihara ............ B62D 5/046
                                                          701/41
2010/0010723 A1*  1/2010  Taki .............. F02N 11/0837
                                                          701/102
2014/0046506 A1*  2/2014  Reichel ............ B62D 15/0285
                                                          701/2
2014/0172220 A1*  6/2014  You ................... G05D 1/0297
                                                          701/23
2014/0197939 A1*  7/2014  Stefan ................ B60Q 9/008
                                                          340/435
2015/0151789 A1*  6/2015  Lee .............. B62D 15/0285
                                                          701/41
2015/0353080 A1* 12/2015  Mukaiyama ......... E05B 77/54
                                                          701/23

FOREIGN PATENT DOCUMENTS

| DE | 102012201038 A1 | 7/2013 |
| DE | 102012208998 A1 | 12/2013 |
| JP | 2007-326415 A | 12/2007 |
| JP | 2008-52670 A | 3/2008 |
| JP | 2011-54116 A | 3/2011 |

* cited by examiner

*Primary Examiner* — Thomas Tarcza
*Assistant Examiner* — Richard Goldman
(74) *Attorney, Agent, or Firm* — Sughrue Mion, PLLC

(57) ABSTRACT

An automatic parking system is disclosed. The automatic parking system includes: a monitoring device configured to monitor a parking space and a traveling path in a parking lot; an automatic drive unit configured to perform an automatic drive control for a vehicle in the parking lot to move from a current position to a predetermined target position in the parking lot based on a monitoring result of the monitoring device; and a contact determination unit configured to perform a contact determination between the vehicle in the automatic drive control and an obstacle, based on the monitoring result, or the like. In a case where the contact determination is performed by the contact determination unit, the automatic drive unit causes the vehicle to stop, and then, causes the vehicle to move to a removal position and to be parked using the automatic drive control.

4 Claims, 10 Drawing Sheets

AUTOMATIC PARKING SYSTEM

CROSS-REFERENCE TO RELATED APPLICATION

This application is based on Japanese Patent Application No. 2014-117296 filed with Japan Patent Office on Jun. 6, 2014, the entire contents of which are hereby incorporated by reference.

TECHNICAL FIELD

The present invention relates to an automatic parking system.

BACKGROUND OF THE INVENTION

In Japanese Unexamined Patent Application Publication No. 2011-054116, an automatic parking system that includes a management center capable of communicating with vehicles in a parking lot and control means for parking the vehicle by an automatic drive control based on information received from the management center, is disclosed. In addition, in Japanese Unexamined Patent Application Publication No. 2007-326415, a contact avoidance control in which, when a vehicle is parked by an automatic drive control, and in a case where a distance between the vehicle and an obstacle is equal to or shorter than a predetermined value, the vehicle is stopped by a brake operation, and then the automatic drive control ends, is disclosed.

SUMMARY OF THE INVENTION

Incidentally, in an automatic parking system disclosed in Japanese Unexamined Patent Application Publication No. 2011-54116, in a case where a vehicle in an automatic drive control is in contact with an obstacle due to a failure of a sensor, or the like, there is a case where the automatic drive control ends and the vehicle stops on a path. In addition, in the automatic parking system disclosed in Japanese Unexamined Patent Application Publication No. 2011-54116, in a case where a contact avoidance control disclosed in Japanese Unexamined Patent Application Publication No. 2007-326415 is performed with respect to the vehicle traveling on a path in a parking lot, the vehicle stops on the path. As in these cases, when the vehicle in an automatic drive control is stuck on the path in the parking lot and other vehicles cannot travel, as a result, there is a risk that the operation and management of the parking lot may be hindered. Therefore, the present invention provides an automatic parking system in which, in a case where a contact determination between the vehicle in the automatic drive control and an obstacle is performed in the parking lot, the vehicle can be removed so as not to interfere with the traveling of other vehicles.

An automatic parking system according to an aspect of the present invention includes: a monitoring device configured to monitor a parking space and a traveling path in a parking lot; an automatic drive unit configured to perform an automatic drive control for a vehicle in the parking lot to move from a current position to a predetermined target position in the parking lot based on a monitoring result of the monitoring device; and a contact determination unit configured to perform a contact determination between the vehicle in the automatic drive control and an obstacle, based on the monitoring result or a detection result of a sensor mounted in the vehicle. In a case where the contact determination is performed by the contact determination unit, the automatic drive unit causes the vehicle to stop, and wherein, after the vehicle stops, the automatic drive unit causes the vehicle to move to a removal position and to be parked using the automatic drive control, and the removal position is determined based on the monitoring result or the detection result.

In the aspect described above, in a case where the contact determination is performed by the contact determination unit during the automatic drive control of the vehicle from the parking space in which the vehicle was parked to the target position, and in the case where a predetermined removal position indeterminable condition is satisfied, the automatic drive unit may cause the vehicle to move to the parking space in which the vehicle was parked or to the target position and to be parked using the automatic drive control.

The automatic parking system according to the aspect described above may further include a door lock control unit configured to control a door lock state of the vehicle. The automatic drive unit may make the door lock state of the vehicle be in a locked state via the door lock control unit in a case where the automatic drive control is performed on the vehicle, and make the door lock state of the vehicle be in an unlocked state via the door lock control unit in a case where the vehicle is parked after the contact determination is performed by the contact determination unit.

According to the aspects of the present invention, in a case where the contact determination between the vehicle in the automatic drive control and the obstacle is performed in the parking lot, it is possible to remove the vehicle so as not to interfere with the traveling of other vehicles.

DESCRIPTION OF THE EMBODIMENTS

Hereinafter, the embodiment of the present invention will be described with reference to the drawings. In the description, the same reference numbers will be assigned to the same or equivalent elements, and the description thereof will not be repeated.

Figure 1:
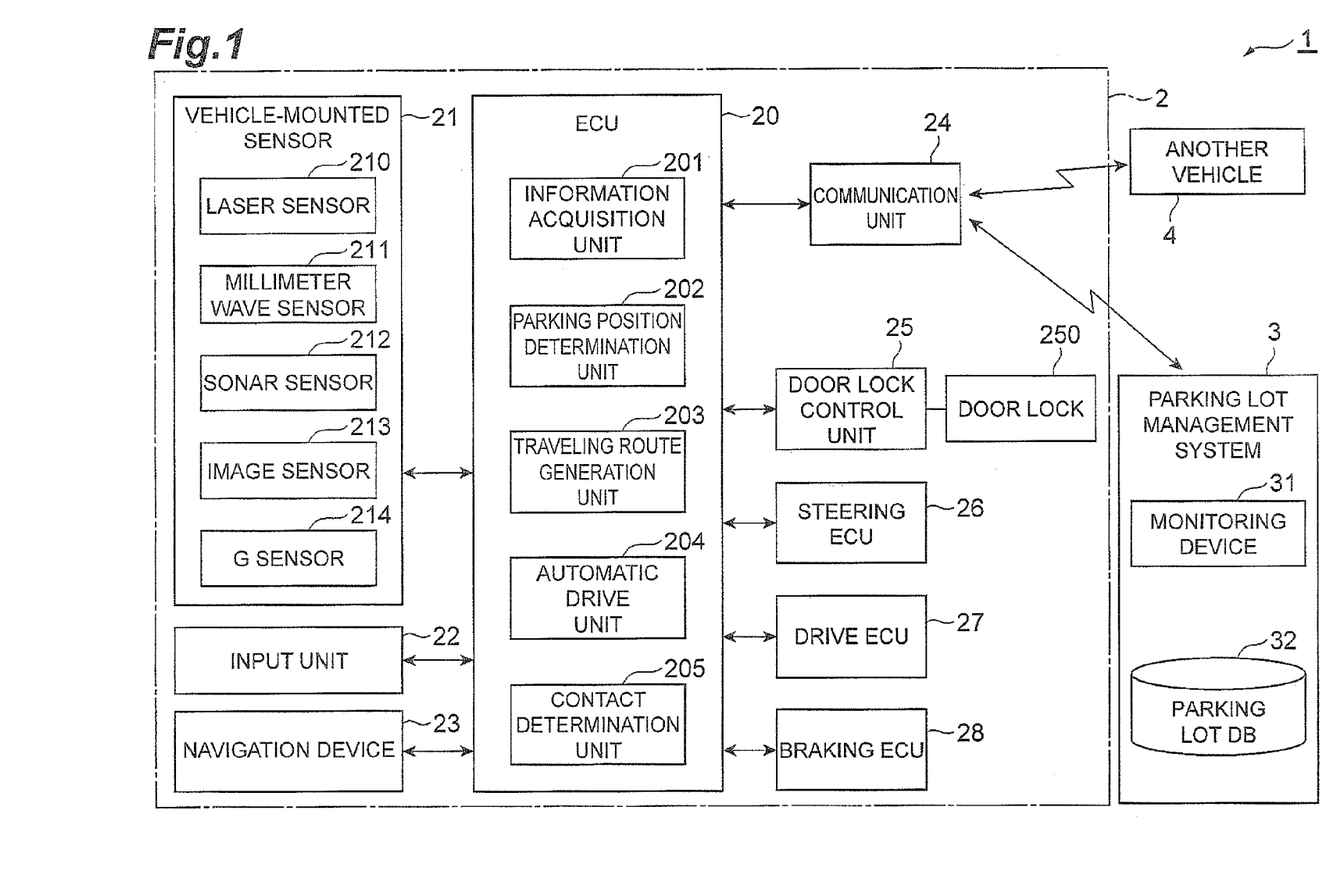
FIG. 1 is a schematic diagram of an automatic parking system in an embodiment.
Figure 2:
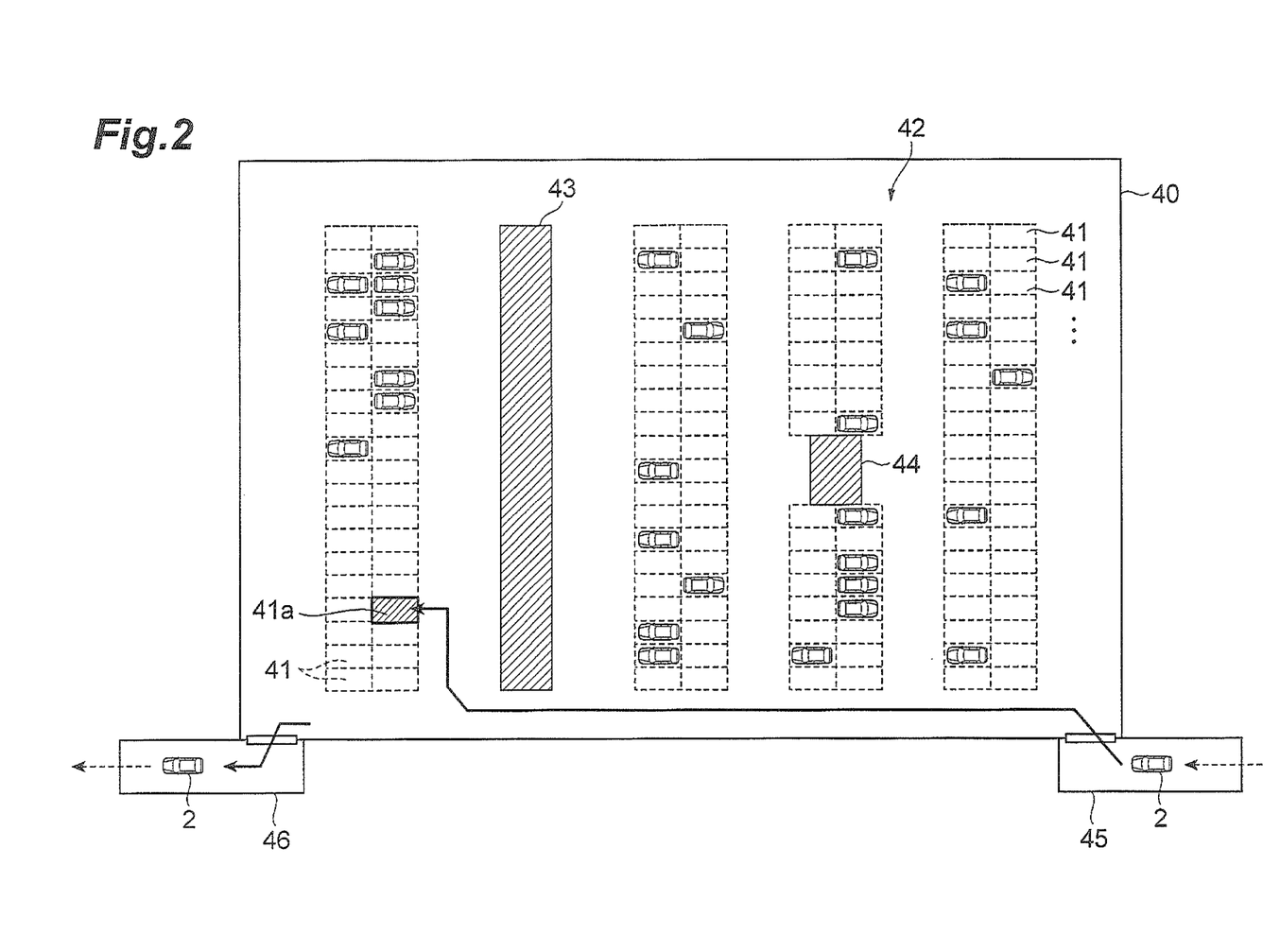
FIG. 2 is a schematic diagram explaining parking using the automatic parking system in FIG. 1.

FIG. 1 is a schematic diagram of an automatic parking system 1 in an embodiment. FIG. 2 is a schematic diagram explaining parking using the automatic parking system 1.

As illustrated in FIG. 1 and FIG. 2, the automatic parking system 1, for example, is a system used for realizing so-called automatic valet parking. Hereinafter, the outline of automatic valet parking will be described using FIG. 2.

Automatic valet parking means, for example, that a vehicle is automatically parked in a parking space in a parking lot after an occupant disembarks from the vehicle in the parking lot, and that the vehicle automatically travels to a boarding position at the occupant boarding time. Note that a plurality of occupants may be in the vehicle.

Specifically, as illustrated in FIG. 2, the parking lot 40 includes a plurality of parking spaces 41. A parking space 41 means, for example, a frame that is defined by white lines, and a place where a vehicle 2 can be parked. For the convenience if illustration, only a portion of parking spaces 41 in the parking lot 40 are denoted by reference numbers, and the reference numbers for denoting all other parking spaces 41 are omitted. Then, in the parking lot 40, a traveling path 42 on which the vehicle 2 can travel is provided. In the parking lot 40, structures such as shielding walls 43 or struts 44 may be provided. In addition, in the parking lot 40, an entrance 45 for the vehicle 2 to enter and an exit 46 for the vehicle 2 to exit are provided.

In the automatic valet parking, the occupant of the vehicle 2 disembarks from the vehicle at the entrance 45 of the parking lot 40 without stopping the engine. In this case, the entrance 45 of the parking lot 40 becomes a disembarkation position. The disembarkation position is not limited to the entrance 45 of the parking lot 40 as long as it is a position where the occupant disembarks from the vehicle 2. In a case where the occupants are in the vehicle 2, they may include a driver of the vehicle 2. Then, the vehicle 2 enters the parking lot using the automatic drive control. The vehicle 2 performs an automatic parking control to park in the predetermined target parking space 41. Then, at the time of leaving, the vehicle 2 moves to the exit 46 from the parking space 41 using the automatic drive control. Then, the occupant boards the vehicle at the exit 46. In this case, the exit 46 of the parking lot 40 becomes a boarding position. The boarding position is not limited to the exit 46 of the parking lot 40 as long as it is a position where the occupant of the vehicle 2 boards the vehicle 2.

All the positions where vehicle 2 moves for the automatic valet parking may be included in the parking lot 40 in the present embodiment. For example, in the automatic valet parking, there is also a case where the disembarkation position of the occupant of the vehicle 2 is on the traveling path in front of the entrance of a hotel, and a position (a general parking lot) that includes the parking space 41 in which the vehicle 2 is parked using the automatic drive control is located at a place separate from the front of the entrance of the hotel. In this case, the traveling path, on which the vehicle 2 travels using the automatic drive control from in front of the entrance of the hotel (the disembarkation position) to the place that includes the parking space 41, may be included in the parking lot 40.

The automatic drive control means the control causing the vehicle 2 to travel in a state where intervention is not performed by the driver. In the automatic drive control, the vehicle 2 in the parking lot 40 is caused to travel from a current position to a target position in the parking lot 40. The current position is a position where the automatic drive control starts, and is, for example, the disembarkation position described above or the parking space 41 in which the vehicle 2 is currently parked. The target position is a position where the automatic drive control ends, and is, for example, the parking space 41 in which the vehicle 2 attempts to park or the boarding position described above. In addition, the removal position described below is also included in the target position. The automatic parking control means the control causing the vehicle 2 to be parked using the automatic drive control in a state where intervention is not performed by the driver.

As illustrated in FIG. 1, the automatic parking system 1 includes an electronic control unit (ECU) 20 that controls the vehicle 2 and a parking lot management system 3 that has a monitoring device 31. The ECU 20 is a vehicle-mounted device mounted in the vehicle 2 which is the parking control subject. The ECU 20 is an electronic unit for executing the automatic drive control (automatic parking control), and is formed of a computer including a CPU, and a ROM or a RAM. The parking lot management system 3 is a management system that is, for example, provided with respect to the parking lot 40 and manages vacancy information of the parking lot 40 and the like.

The parking lot management system 3 has a function of communicating with vehicles in the parking lot 40 (road-to-vehicle communication function). For example, the parking lot management system 3 includes the monitoring device 31. The monitoring device 31 monitors the parking spaces 41 and the traveling path 42 in the parking lot 40. The monitoring device 31 transmits a monitoring result to the vehicle 2 according to a request from the vehicle 2. The monitoring result means information items such as the vacancy information of the parking spaces 41 in the parking lot 40 for parking the vehicle 2 and the information on the position, direction, and the speed of other vehicles 4 traveling on the traveling path 42. The monitoring device 31 includes, for example, an image sensor (a camera) that images the parking spaces 41 and the traveling path 42 or an infrared sensor that detects the parking of the vehicle in the parking spaces 41. In addition, the monitoring device 31 may monitor the vehicles by the road-to-vehicle communication function. In addition, the parking lot management system 3 includes, for example, a parking lot DB 32 in which map data (coordinate data of the parking spaces 41 and path data of the traveling path 42) of the parking lot 40 is stored. The monitoring device 31 is configured so as to refer to the parking lot DB 32, and the content of the parking lot DB 32 can be transmitted to the vehicle 2 via the communication.

The vehicle 2 has a vehicle-mounted sensor 21, an input unit 22, a navigation device 23, and a communication unit 24. The vehicle-mounted sensor 21 is a sensor mounted in the vehicle 2. The vehicle-mounted sensor 21 includes, for example, a sensor that detects an object (an obstacle or white lines) around the vehicle 2 and a sensor that is used for detecting whether or not the vehicle 2 is in contact with the obstacle. The obstacles are objects in the parking lot 40 such as another vehicle 4, the shielding wall 43 and the strut 44. For example, a laser sensor 210, a millimeter wave sensor 211, and a sonar sensor 212 or an image sensor 213 are included in the sensor that detects the object around the vehicle 2. The sensor that detects the object around the vehicle 2 outputs position information of the object around the vehicle 2 (including a relative distance), relative speed as the detection result, or the like. For example, an acceleration sensor (G sensor) 214, a pressure sensor, or the like is included in the sensor that is used for detecting whether or not the vehicle 2 is in contact with the obstacle. The vehicle-mounted sensor 21 outputs a detection signal to the ECU 20.

The input unit 22 is an interface to which the occupant's operation regarding at least the starting and ending of the automatic drive control (the automatic parking control) are input. Switches or a touch panel is included in the input unit 22. The input unit 22 outputs an operation signal to the ECU 20.

The navigation device 23 is a device that performs a route guidance of the vehicle 2, and for example, has map information. The navigation device 23 is configured to include a global positioning system (GPS) so as to be able to acquire position information of the vehicle 2. The navigation device 23, for example, displays the position of the vehicle 2 on a map as a display and performs the traveling guide or the travel guidance of the vehicle 2. In the navigation device 23, the map data of the parking lot 40 may be stored in the map storage unit of the navigation device 23 in advance. The navigation device 23 outputs a vehicle position information signal to the ECU 20.

The communication unit 24 is communication means for communicating with devices outside the vehicle 2, and has, for example, a function (road-to-vehicle communication function) of communicating with the parking lot management system 3. In addition, the communication unit 24 may have a function (vehicle-to-vehicle communication function) of communicating with another vehicle 4. The communication unit 24 outputs various signals to the ECU 20.

The ECU 20 includes an information acquisition unit 201, a parking position determination unit 202, a traveling route generation unit 203, an automatic drive unit 204, and a contact determination unit 205.

The information acquisition unit 201 acquires information items from various devices. For example, the information acquisition unit 201 acquires information items needed for the automatic drive control (automatic parking control) from the vehicle-mounted sensor 21, the input unit 22, the navigation device 23, and the communication unit 24.

The parking position determination unit 202 has a function of determining the target parking space 41a. The target parking space 41a is a parking space 41 that becomes the target position of the automatic parking control. For example, the parking position determination unit 202 determines the target parking space 41a based on the information acquired by the information acquisition unit 201. As one of a specific example, the parking position determination unit 202 may recognize a vacancy of the parking space 41 based on the detection result of the vehicle-mounted sensor 21, and may determine the target parking space 41a among the vacant parking spaces 41. Alternatively, the parking position determination unit 202 may recognize a vacancy of the parking space 41 based on the monitoring result of the monitoring device 31 and may determine the target parking space 41a among the vacant parking spaces 41. In addition, the parking position determination unit 202 may also determine the predetermined parking space 41 acquired via the communication unit 24 as the target parking space 41a.

The traveling route generation unit 203 generates the traveling route based on the map data of the parking lot 40 acquired by the information acquisition unit 201. The traveling route is, for example, the traveling route of the vehicle 2 from the entrance 45 to the target parking space 41a, the traveling route of the vehicle 2 from the currently parked parking space 41 to another parking space 41, or the traveling route of the vehicle 2 from the currently parked parking space 41 to the exit 46.

The automatic drive unit 204 performs the automatic drive control (automatic parking control) of the vehicle 2 in the parking lot 40 from the current position to the predetermined target position (for example, target parking space 41a or the boarding position of the occupant) in the parking lot 40 based on the monitoring result of the monitoring device 31. The automatic drive unit 204 performs the automatic drive control of the vehicle 2 such that the vehicle 2 travels in accordance with the traveling route generated by the traveling route generation unit 203. The automatic drive unit 204 performs the automatic drive control by outputting a control signal to a drive ECU 27, a braking ECU 28, and a steering ECU 26 described below. The automatic drive unit 204 outputs a control signal to a door lock control unit 25 described below in a case of controlling a door lock 250, or the like.

The contact determination unit 205 performs the determination of contact (contact determination) between the vehicle 2 in the automatic drive control and the obstacle, using the automatic drive unit 204 based on the monitoring result of the monitoring device 31 or the detection result of the vehicle-mounted sensor 21 in the vehicle 2. The contact determination is the determination of whether or not the vehicle 2 and the obstacle are in contact with each other. The contact determination unit 205 performs the determination of whether or not the vehicle 2 and the obstacle are in contact with each other based on the monitoring result of the monitoring device 31 or the detection result of the vehicle-mounted sensor 21 in the vehicle 2. The contact determination unit 205 performs the contact determination based on, for example, an analysis result of an image using the camera of the monitoring device 31. Alternatively, the contact determination unit 205 performs the contact determination based on, for example, a detection result of the G sensor 214.

In the contact determination, the determination that the contact between the vehicle 2 and the obstacle is predicted, is included. That is, the contact determination means that the vehicle 2 and the obstacle are in contact with each other or are predicted to be in contact. The contact determination unit 205 determines that the contact between the vehicle 2 and the obstacle is predicted based on the monitoring result of the monitoring device 31 or the detection result of the vehicle-mounted sensor 21 in the vehicle 2. For example, the contact determination unit 205 determines that the contact is predicted based on the analysis result of the image using the camera of the monitoring device 31. Alternatively, the contact determination unit 205 calculates a time to collision (TTC) between the vehicle 2 and the obstacle based on the detection result of the laser sensor 210 or the millimeter wave sensor 211, for example. In a case where the TTC is smaller than a predetermined contact determination threshold value, the contact determination unit 205 determines that the contact is predicted. In a case where the contact determination is performed, the contact determination unit 205 outputs a signal indicating the fact to the ECU 20.

The automatic drive unit 204 determines whether or not the contact determination is performed by the contact determination unit 205. In a case where the contact determination is performed by the contact determination unit 205, the automatic drive unit 204 stops the vehicle 2. The automatic drive unit 204 may perform the automatic drive control such that the vehicle 2 stops after returning to a driving change point in the automatic drive control immediately before the contact determination is performed by the contact determination unit 205. The driving change point includes, for example, a point where the driving is changed to backward driving from forward driving, or a point where a steering angle is changed. Then, the automatic drive unit 204 outputs a signal to the parking position determination unit 202 so as to determine the removal position based on the monitoring result of the monitoring device 31 or the detection result of the vehicle-mounted sensor 21 in the vehicle 2. Then, the automatic drive unit 204 causes the vehicle 2 to move to the removal position determined by the parking position determination unit 202.

The parking position determination unit 202 determines the removal position based on, for example, the vacancy information of the parking space 41 acquired by the information acquisition unit 201 and the map data of the parking lot 40. Specifically, the parking position determination unit 202 determines the vacant parking space 41 (including the parking space 41 in which the vehicle 2 was parked) as the removal position. The vacancy information of the parking space 41 may be acquired using the detection result of the vehicle-mounted sensor 21. Alternatively, the vacancy information of the parking space 41 may be acquired by the monitoring result of the monitoring device 31. The map data of the parking lot 40 may be acquired from the monitoring device 31. Alternatively, the map data of the parking lot 40 may be stored in the map storage unit included in the navigation device 23 in advance.

The parking position determination unit 202 may acquire the vacancy information of the parking space 41 based on the monitoring result of the monitoring device 31 or the detection result of the vehicle-mounted sensor 21 in the vehicle 2, and may determine whether or not a section is vacant using the map data of the parking lot 40 including, for example, the information of the section provided for the emergency removal in the parking lot 40, and in a case where the section is vacant, the section may be determined as the removal position. By disposing indicators that can be detected by the vehicle-mounted sensor 21 in the vehicle 2 in the section provided for the emergency removal, it can be determined whether or not the section is vacant based on the detection result of the vehicle-mounted sensor 21 in the vehicle 2, and the section can be determined as the removal position without using the map data of the parking lot 40. Alternatively, the parking position determination unit 202 may determine the position where the traveling of another vehicle 4 is not interfered on the traveling path 42 in the parking lot 40 as the removal position based on the monitoring result of the monitoring device 31 or the detection result of the vehicle-mounted sensor 21 in the vehicle 2. For example, the parking position determination unit 202 can determine the position where the traveling of another vehicle 4 is not interfered as the removal position based on width information of the traveling path 42 acquired by the map data of the parking lot 40 and width information of the vehicle 2. Alternatively, by acquiring the width information of the traveling path 42 using the vehicle-mounted sensor 21 in the vehicle 2, the position where the traveling of another vehicle 4 is not interfered can be deter ruined as the removal position.

In a case where there is a plurality of removal position candidates, the automatic drive unit 204 may determine the removal position candidate nearest to the vehicle 2 as the removal position. Alternatively, in a case where there is a plurality of removal position candidates, the automatic drive unit 204 may determine the removal position candidate of which the traveling route from the vehicle 2 to each removal position candidate is the shortest as the removal position.

The traveling route generation unit 203 generates the traveling route from the current position of the vehicle 2 to the removal position based on the map data of the parking lot 40 acquired by the information acquisition unit 201. In a case where it is determined that the vehicle 2 cannot travel on the generated traveling route due to the existence of an obstacle based on the monitoring result of the monitoring device 31 or the detection result of the vehicle-mounted sensor 21 in the vehicle 2, the traveling route generation unit 203 causes the parking position determination unit 202 to re-determine a new removal position. Alternatively, when the parking position determination unit 202 determines the removal position, the parking position determination unit 202 may determine the removal position such that the vehicle 2 can arrive at the removal position without being interfered by an obstacle.

In a case where it is determined that the contact determination is performed by the contact determination unit 205 during the automatic drive control of the vehicle from the parking space 41 in which the vehicle was parked to the target position, and when a removal position indeterminable condition set in advance is satisfied, the automatic drive unit 204 causes the vehicle to move to the parking space 41 in which the vehicle was parked or the predetermined target position and to be parked using the automatic drive control. The removal position indeterminable condition is a condition whether the determination of the removal point is possible or not. It may be determined that the removal position indeterminable condition is satisfied in a case where, for example, a problem occurs in at least one of the functions of the vehicle-mounted sensor 21 and the communication unit 24 due to contact of the vehicle with an obstacle, and as a result, the removal position cannot be determined even based on both of the monitoring result of the monitoring device 31 and the detection result of the vehicle-mounted sensor 21 of the vehicle 2. For example, it may be determined that the removal position indeterminable condition is satisfied in a case where a problem occurs in the function of the communication unit 24 and the detection result of the monitoring device 31 cannot be acquired, and when the removal position around the vehicle 2 cannot be detected by the vehicle-mounted sensor 21 of the vehicle 2 even though the vehicle-mounted sensor 21 of the vehicle 2 functions normally.

The traveling route from the parking space 41 in which the vehicle was parked is stored in the automatic drive unit 204 as history information. The automatic drive unit 204 may cause the vehicle 2 to move to the parking space 41 in which the vehicle was parked and to be parked using the automatic drive control, based on the history information.

Furthermore, the automatic drive unit 204 may determine whether or not it is possible to cause the vehicle 2 to travel using the automatic drive control based on the situation information acquired by the information acquisition unit 201. For example, the output signal of the communication unit 24, the output signal of the vehicle-mounted sensor 21, or the output signal of each ECU is included in the situation information. Specifically, the automatic drive unit 204 determines that there exists a function which is inexecutable, for example, in a case where a response signal is not input during a predetermined time interval or in a case where a signal indicating a failure of the device is input. Then, the automatic drive unit 204 determines that the traveling of the vehicle 2 using the automatic drive control is not possible in a case where, for example, the inexecutable function relates to the steering, driving, or the braking.

In a case where it is determined that the traveling of the vehicle 2 using the automatic drive control is not possible, the automatic drive unit 204 may perform warning processing. Specifically, the automatic drive unit 204 notifies a mobile terminal of the occupant or the monitoring device 31 of the situation via the communication unit 24. Alternatively, automatic drive unit 204 may turn on a hazard lamp, or the like.

The above-described information acquisition unit 201, the parking position determination unit 202, the traveling route generation unit 203, the automatic drive unit 204, and the contact determination unit 205 may be formed of one electronic control unit or a plurality of electronic control units.

The vehicle 2 includes the door lock control unit 25, the steering ECU 26, the drive ECU 27, and the braking ECU 28. The door lock control unit 25 controls a door lock state of the vehicle 2 based on the control signal from the ECU 20. The automatic drive unit 204 may make the door lock state of the vehicle 2 be in a locked state via the door lock control unit 25 during the automatic drive control. In addition, in a case where vehicle 2 is parked after the contact determination is performed by the contact determination unit 205, the automatic drive unit 204 may make the door lock state of the vehicle 2 be in an unlocked state via the door lock control unit 25.

The steering ECU 26 is an electronic control unit that performs the steering control of the vehicle 2, and controls the steering of the vehicle 2 by, for example, performing the drive control of a motor provided on the steering mechanism. This steering ECU 26 executes the steering control based on the control signal from the ECU 20.

The drive ECU 27 is an electronic control unit that performs the traveling drive control of the vehicle 2, and performs the drive control of a motor or an engine mounted in the vehicle 2. This drive ECU 27 executes the drive control based on the control signal from the ECU 20.

The braking ECU 28 is an electronic control unit that performs the braking control of the brake of the vehicle 2, and performs the braking control by, for example, adjusting the operation of a pump or a motor incorporated in a brake hydraulic circuit. This braking ECU 28 executes the braking control based on the control signal from the ECU 20.

Figure 3:
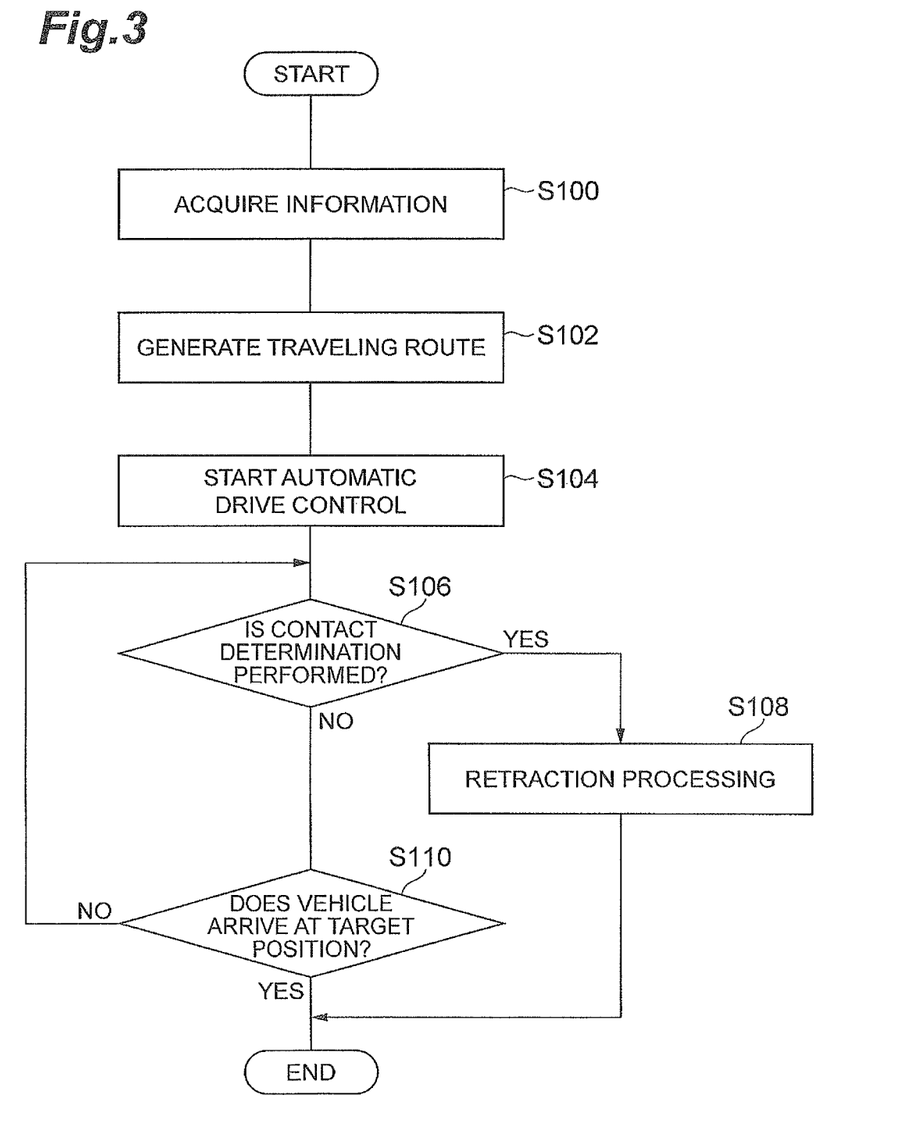
FIG. 3 is a flowchart illustrating an operation of the automatic parking system in FIG. 1 at a vehicle side.
Figure 4:
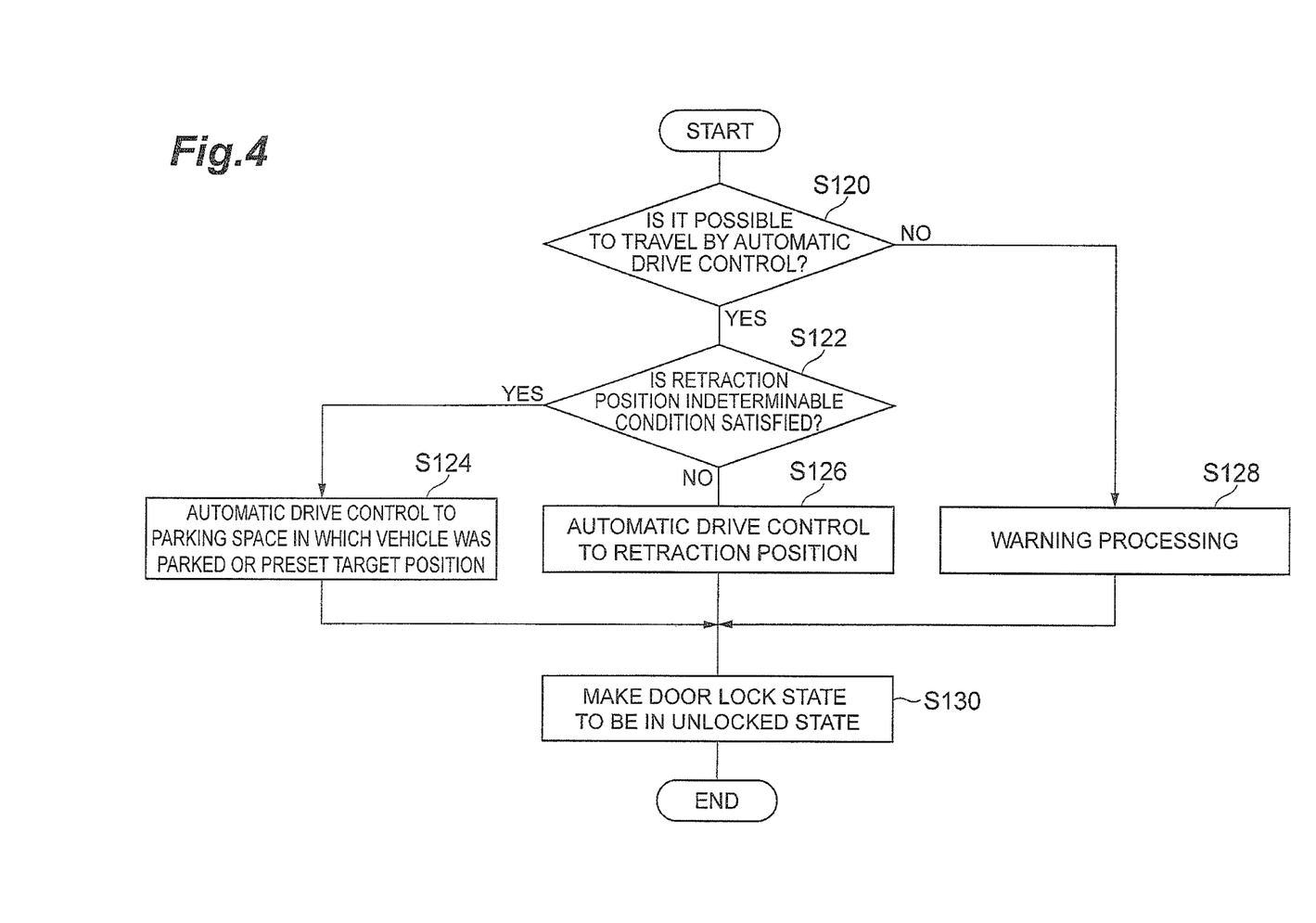
FIG. 4 is a flowchart illustrating an operation of the automatic parking system in FIG. 1 at the vehicle side.

Next, the operation of the automatic parking system 1 in the present embodiment will be described. FIG. 3 is a flow chart illustrating the processing in the automatic parking system 1 in the present embodiment. FIGS. 3 and 4 illustrate the processing tasks performed when the vehicle 2 travels in the parking lot 40 using the automatic drive control (automatic parking control). For example, the processing starts when the operation by the occupant to start the automatic drive control is input by the occupant via the input unit 22 or the mobile terminal.

As illustrated in S100 in FIG. 3, the information acquisition unit 201 acquires the information necessary for the automatic drive control. The information acquisition unit 201 acquires, for example, the map data of the parking lot 40 and the vacancy information of the parking space 41 from the parking lot management system 3.

Next, the process proceeds to traveling route generation processing (S102). First, the parking position determination unit 202 determines the target position. In a case of entering or changing the parking position, the target position is determined based on the vacancy information of the parking space 41 obtained in the processing of S100. In this case, the target parking space 41a becomes the target position. At the time leaving, for example, the exit 46 becomes the target position. Then, the traveling route generation unit 203 generates the traveling route of the vehicle 2 from the current position to the target position using the map data of the parking lot 40.

Next, the automatic drive control is started (S104). The automatic drive unit 204 starts the vehicle control including the automatic drive control. The automatic drive unit 204 performs the automatic drive control of the vehicle 2 in the parking lot 40 to move from the current position to the target position in the parking lot 40 determined in the processing of S102, based on the monitoring result of the monitoring device 31. The automatic drive unit 204 performs the automatic drive control by outputting the control signal to the drive ECU 27, the braking ECU 28, and the steering ECU 26. Furthermore, the automatic drive unit 204 outputs the control signal to the door lock control unit 25 before or at the same time as when the automatic drive control is started, and controls the door lock 250 to be in the locked state.

Next, it is determined whether the contact determination is performed or not (S106). In the processing of S106, the automatic drive unit 204 determines whether or not the contact determination is performed by the contact determination unit 205. The contact determination unit 205 repeatedly determines whether or not the contact determination between the vehicle 2 in the automatic drive control and the obstacle is performed. In a case where the contact determination is performed by the contact determination unit 205, the process proceeds to the removal processing (S108). The removal processing will be described below. In a case where the removal processing described below ends, the control processing illustrated in FIG. 3 ends.

On the other hand, in a case where the contact determination is not performed by the contact determination unit 205, the process proceeds to arrival determination processing (S110). In the processing of S110, the automatic drive unit 204 determines whether or not the vehicle 2 has arrived at the target position based on the monitoring result of the monitoring device 31 or the detection result of the vehicle mounted sensor 21 in the vehicle 2. In a case where it is determined using the automatic drive unit 204 that the vehicle 2 has not arrived at the target position, the process proceeds to the processing of S106 once again. In this way, during the automatic drive control (automatic parking control), the determination in S106 is repeatedly executed, and when the vehicle 2 arrives at the target position, the automatic drive control ends and the control processing illustrated in FIG. 3 ends.

Next, the removal processing will be described. FIG. 4 is a flowchart illustrating the removal processing. When the removal processing in FIG. 4 starts, the vehicle 2 is stopped.

First, as illustrated in S120 in FIG. 4, the automatic drive unit 204 determines whether it is possible to cause the vehicle 2 to travel using the automatic drive control or not based on the situation information acquired by the information acquisition unit 201. The automatic drive unit 204 determines that there exists an inexecutable function in a case where, for example, the response signal is not input for the predetermined time interval or in a case where the signal that indicates the failure of the device. Then, the automatic drive unit 204 determines that the traveling of the vehicle 2 using the automatic drive control is not possible in a case where, for example, the inexecutable function relates to the steering, driving, or the braking.

In the processing in S120, in a case where the automatic drive unit 204 determines that the traveling of the vehicle 2 using the automatic drive control is not possible, the process proceeds to the warning processing (S128). In the processing of S128, the automatic drive unit 204 causes the vehicle 2 to wait at the current position, and notifies the mobile terminal of the occupant or the monitoring device 31 of the situation via the communication unit 24.

Next, the automatic drive unit 204 makes the door lock state of the vehicle 2 be in an unlocked state (S130). In the processing of S130, the automatic drive unit 204 makes the door lock state of the vehicle 2 be in an unlocked state via the door lock control unit 25. In this way, for example, the occupant or the manager of the parking lot 40 can board the vehicle 2. Accordingly, it is possible to quickly react to the situation. Then, the control processing in FIG. 4 ends.

On the other hand, in a case where the automatic drive unit 204 determines in the processing of S120 that the traveling of the vehicle 2 using the automatic drive control is possible, the process proceeds to the processing of S122. In the processing of S122, the automatic drive unit 204 determines whether or not the removal position indeterminable condition is satisfied.

In the processing of S122, in a case where it is determined that the removal position indeterminable condition is not satisfied, the automatic drive control to the removal position is performed (S126). In the processing of S126, the parking position determination unit 202 determines the removal position (including the parking space in which the vehicle 2 was parked) based on the vacancy information of the parking space 41 acquired by the information acquisition unit 201 and the map data of the parking lot 40. Next, generates the traveling route generation unit 203 generates the traveling route of the vehicle 2 from the current position to the target position (removal position) using, for example, the map data of the parking lot 40. Next, the automatic drive unit 204 performs the automatic drive control, and causes the traveling of the vehicle 2 such that it parks in the removal position. When the processing of S126 ends, the process proceeds to the processing in which the door lock state is made to be in an unlocked state (S130). When the door lock state is made to be in an unlocked state, the control processing illustrated in FIG. 4 ends.

On the other hand, in the processing of S122, in a case where it is determined that the removal position indeterminable condition is satisfied, the automatic drive control to the parking space 41 in which the vehicle 2 was parked or the predetermined target position (S124) is performed. For example, in the processing of S124, the automatic drive unit 204 causes the vehicle 2 to move to the parking space 41 in which the vehicle 2 was parked and to be parked using the automatic drive control, based on the history information of the automatic drive control to the current position. In this way, the vehicle 2 returns to the original parking space 41. Alternatively, the automatic drive unit 204 may cause the vehicle 2 to move to the predetermined target position and to be parked using the automatic drive control, based on the route information to the target position (predetermined target position) determined in the processing of S102. In this way, the vehicle 2 moves to the predetermined target position. In a case where the vehicle 2 does not start from the parking space 41, the processing similar to the warning processing illustrated in S128 is performed. When the processing of S124 ends, the process proceeds to the processing in which the door lock state is made to be in an unlocked state (S130). When the door lock state is made to be in an unlocked state, the control processing illustrated in FIG. 4 ends.

Figure 5:
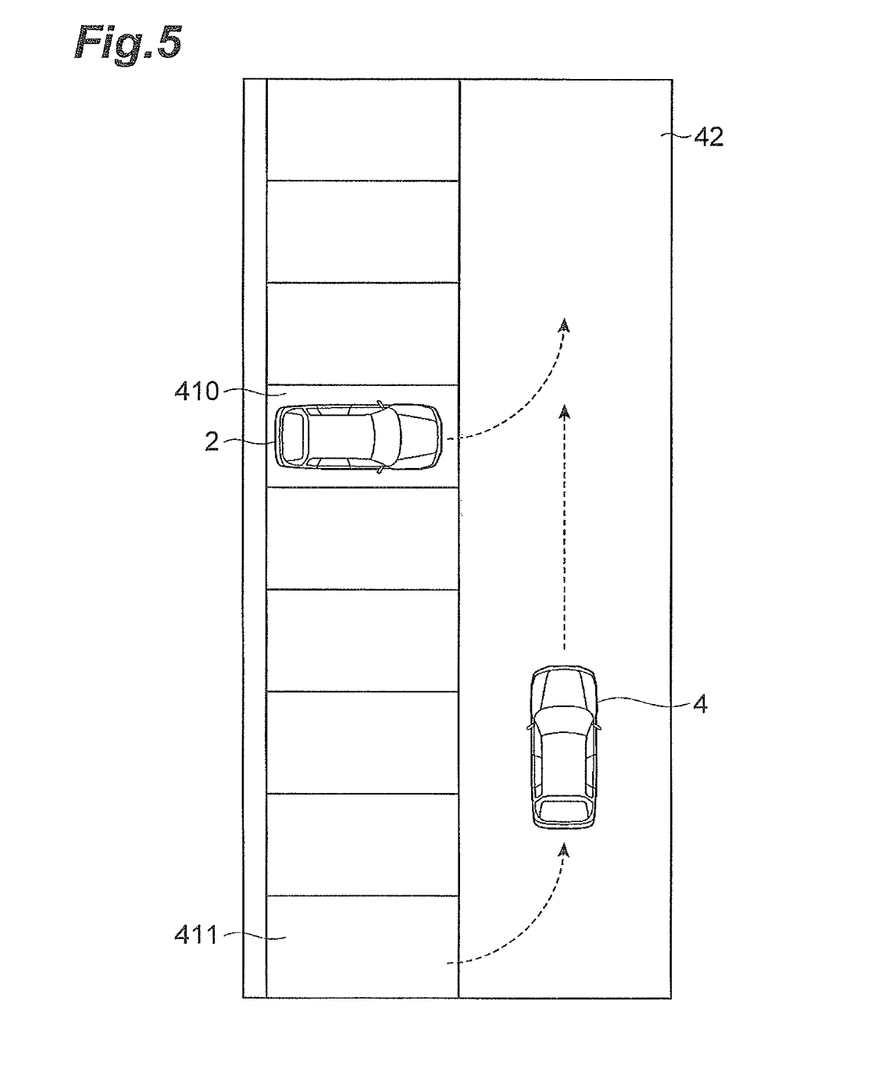
FIG. 5 is an example illustrating a situation before a contact.

The control processing tasks in FIGS. 3 and 4 end as above. Next, the effects of the operations in FIGS. 3 and 4 will be summarized using scenes. First, a scene of the contact between the vehicle 2 and another vehicle 4 will be described. FIG. 5 is an explanatory diagram illustrating a situation before the contact between the vehicle 2 and another vehicle 4. The vehicle 2 and another vehicle 4 respectively travel using the automatic drive control by the ECU 20. Another vehicle 4 is configured similar to the vehicle 2 in the present embodiment. As illustrated in FIG. 5, the vehicle 2 starts from the parked state in a first parking space 410 using the automatic drive control as illustrated in the drawing by an arrow. Another vehicle 4 starts from the parked state in a second parking space 411 using the automatic drive control as illustrated in the drawing by an arrow and travels on the traveling path 42 using the automatic drive control.

Figure 6:
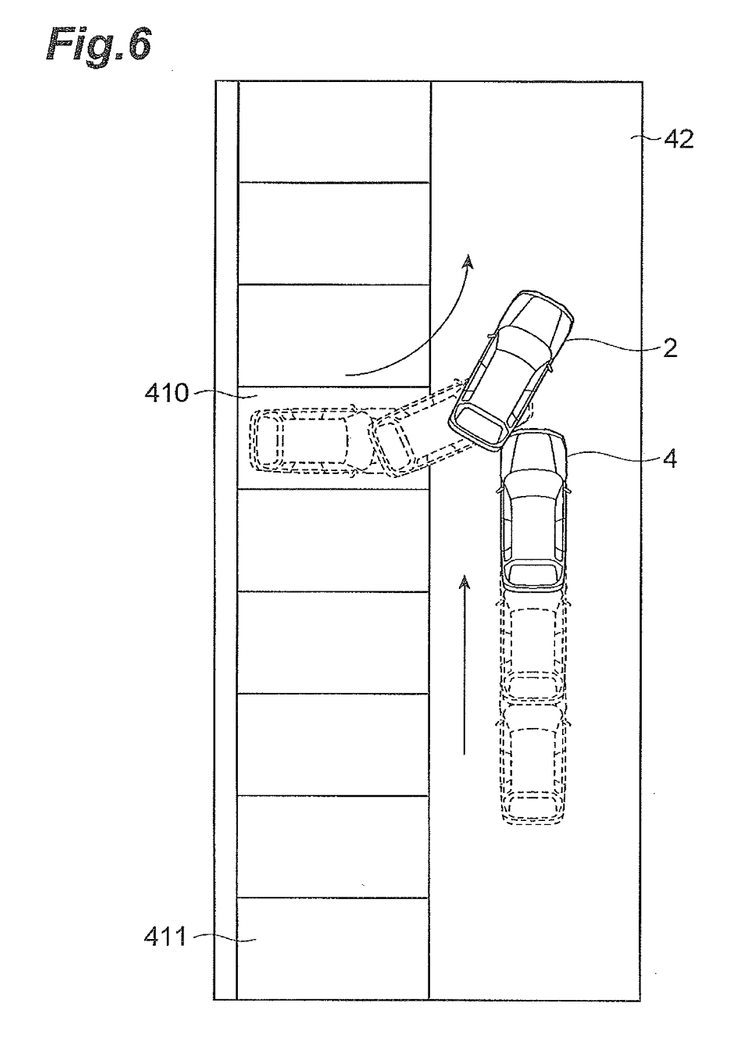
FIG. 6 is an example illustrating a situation at the time of the contact.

FIG. 6 illustrates a situation subsequent to the situation illustrated in FIG. 5, and is an explanatory diagram illustrating the situation at the time of contact between the vehicle 2 and another vehicle 4. The vehicles drawn in solid lines in FIG. 6 illustrate the vehicles at the time of the contact. The vehicles drawn in dashed lines in FIG. 6 illustrate traveling trajectories of the vehicles to the contact position. In FIG. 6, the case where the vehicle 2 and another vehicle 4 illustrated in FIG. 5 travel using the automatic drive control and the contact determination is performed is illustrated. The situation in a case where the contact is predicted and avoided is the same.

In a case of the situation illustrated in FIG. 6, in the conventional art, the automatic drive control is stopped and the vehicle 2 and another vehicle 4 stop and block the traveling path 42. For this reason, vehicles for performing reaction-processing such as rescue operation or restoring work or other vehicles that use the parking lot 40 cannot pass the traveling path 42. In this case, there is a risk that the operation and management of the parking lot 40 may be hindered.

Figure 7:
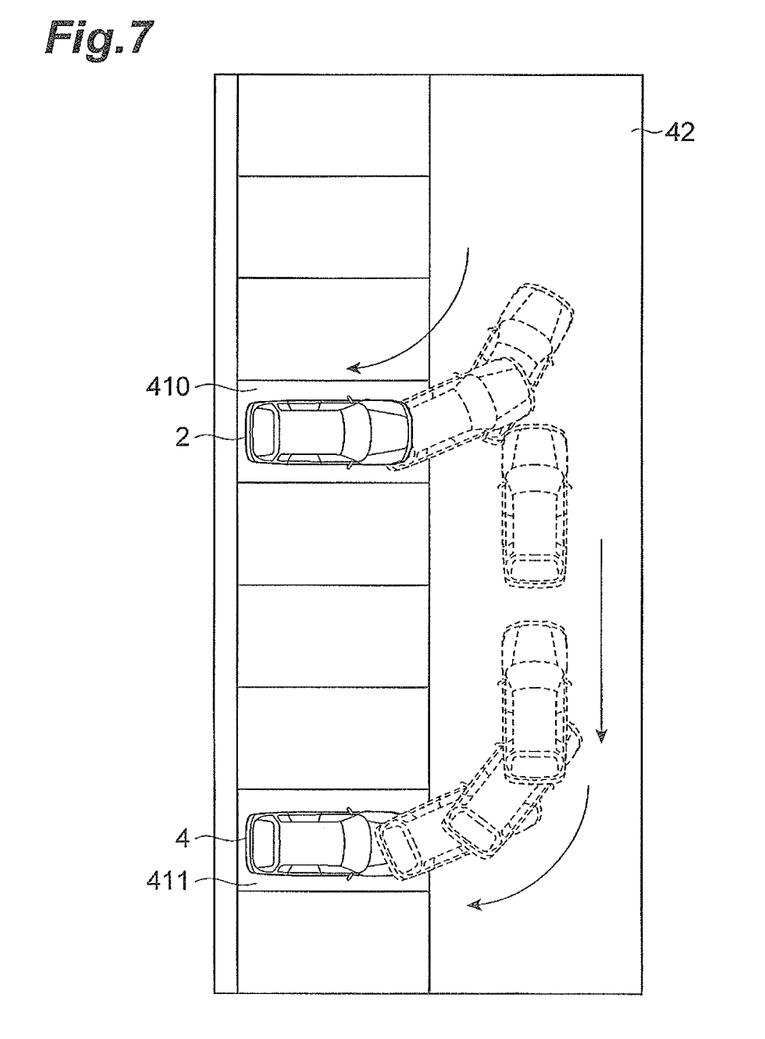
FIG. 7 is an example illustrating a removal after the contact.

On the contrary, in the automatic parking system 1 in the present embodiment, as illustrated in FIG. 7, after the contact determination is performed, the vehicle 2 is moved to the removal position (here, the first parking space 410) using the automatic drive control, and is parked. In addition, when another vehicle 4 cannot determine the removal position, that is, in a case where the removal position indeterminable condition is satisfied, another vehicle 4 is caused to return to the second parking space 411 in which another vehicle 4 was parked and to be parked using the automatic drive control, based on the history information of the automatic drive control to the current position. In this way, in a case where the contact determination is performed during the automatic drive control, the vehicle 2 and another vehicle 4 can be removed from the traveling path 42. Accordingly, the traveling path 42 that is necessary for the reaction-processing such as the rescue operation or the restoring work can be ensured, and it is possible to continue to perform the operation of the parking lot 40 because other vehicles that use the parking lot 40 can travel.

Figure 8:
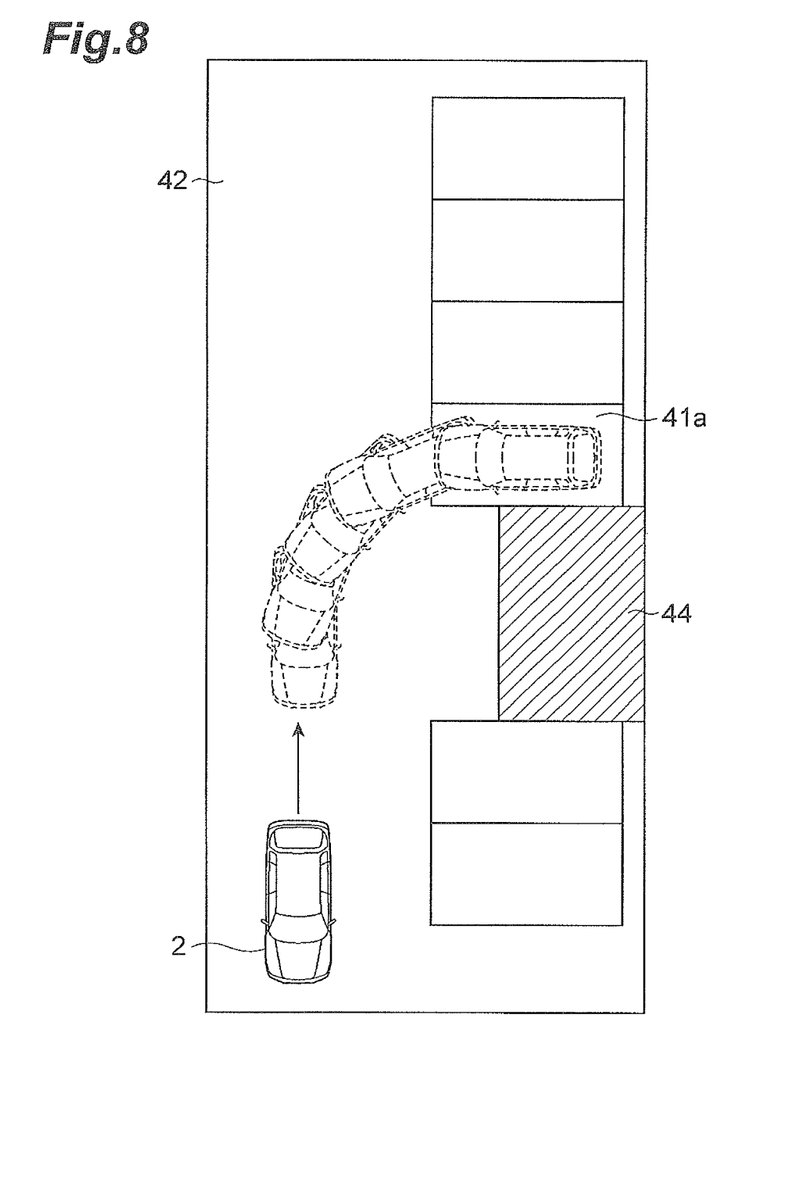
FIG. 8 is an example illustrating a situation before a contact.

Next, the scene of the contact between the vehicle 2 and the strut 44, or the like will be described. FIG. 8 is an explanatory diagram illustrating a situation in which the vehicle 2 is parked using the automatic drive control. The vehicle drawn in solid lines in the drawing illustrates the vehicle 2 before the movement and the vehicle drawn in dashed lines illustrates an assumed trajectory of the vehicle 2. FIG. 8 illustrates a scene in which vehicle 2 is parked in the target parking space 41a using the automatic parking control based on the monitoring result of the monitoring device 31 or the detection result of the vehicle-mounted sensor 21 in the vehicle 2.

Figure 9:
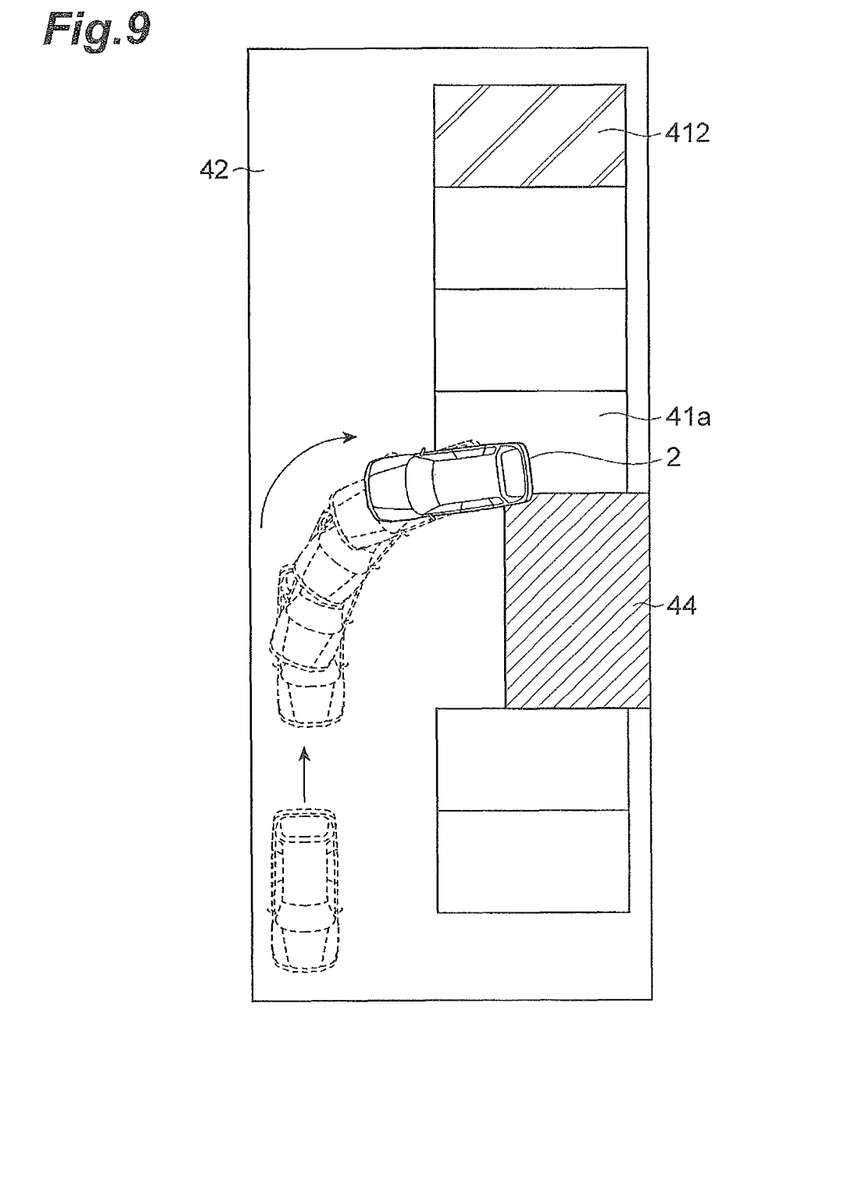
FIG. 9 is an example illustrating a situation at the time of the contact.

FIG. 9 illustrates a situation subsequent to the situation illustrated in FIG. 8 and is an explanatory diagram illustrating the situation at the time when the contact between the vehicle 2 and an obstacle (here, the strut 44). The vehicles drawn in solid lines in FIG. 9 illustrate the vehicles 2 at the time of the contact. The vehicles drawn in dashed lines in FIG. 9 illustrate traveling trajectories of the vehicles 2 to the contact position. In FIG. 9, a third parking space 412 shaded by oblique lines is a parking space prepared for an emergency. In FIG. 9, the case where the contact determination between the vehicle 2 in the automatic parking control and the strut 44 is performed to the target parking space 41a is illustrated. The situation in a case where the contact is predicted and avoided is the same.

In a case of the situation illustrated in FIG. 9, in the conventional art, the automatic drive control is stopped and the vehicle 2 stops and blocks the traveling path 42. For this reason, vehicles for performing reaction-processing such as rescue operation or restoring work or other vehicles that uses the parking lot 40 cannot pass the traveling path 42. In this case, there is a risk that the operation and management of the parking lot 40 may be hindered.

Figure 10:
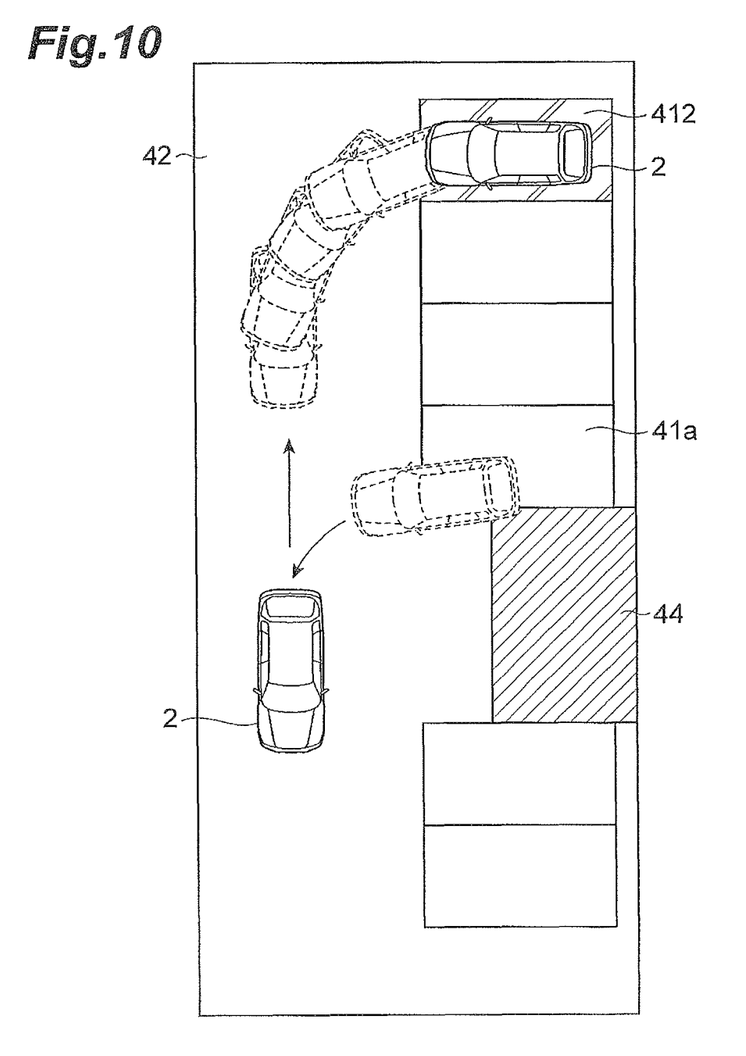
FIG. 10 is an example illustrating a removal after the contact.

On the contrary, in the automatic parking system 1 in the present embodiment, as illustrated in FIG. 10, after the contact determination is performed, the vehicle 2 is moved to the predetermined removal position (here, the third parking space 412) using the automatic drive control, and is parked. In a case where the vehicle 2 is moved to the predetermined removal position, the vehicle 2 is caused to once return to the traveling path 42, and then, is moved to the removal position using the history information of the automatic drive control to the target parking space 41a. In this case, since the calculation cost decreases, is possible to remove the vehicle 2 from the traveling path 42. In addition, the traveling path 42 that is necessary for the reaction-processing such as the rescue operation or the restoring work can be ensured, and it is possible to continue to perform the operation of the parking lot 40 because other vehicles that use the parking lot 40 can travel.

The above-described embodiment is one embodiment of the automatic parking system in the present invention, and the automatic parking system according to the present invention is not limited to what is described in the above embodiment.

For example, the present invention is also applicable to a case where the parking lot is not a valet parking dedicated parking lot. In addition, in the embodiment described above, the description is made with the example of the automatic parking system in the parking lot. However, the system described in the embodiment above may be applied to the case of automatic traveling on a road.

In addition, all or a part of the functions of the monitoring device 31 may be executed by the ECU 20 instead. In addition, a part of the function of the ECU 20 may be executed by the monitoring device 31 instead.

In addition, the automatic parking system 1 is applicable to a case where the automatic drive control (automatic parking control) is performed in at least a part of section in the parking lot 40.

In addition, the processing in S120 described above may be omitted. In addition, the processing tasks in S122 and S124 may be omitted.

Furthermore, in a case where contact determination is performed, and a vacant parking space 41 does not exist and there is no proper removal position even on the traveling path 42, the automatic drive unit 204 may cause the vehicle 2 to move to the last traveling change point and to wait until a vacant parking space 41 becomes available.

What is claimed is:

1. An automatic parking system comprising:
   a monitoring device configured to monitor a parking space and a path in a parking lot;
   an automatic drive unit configured to perform an automatic drive control for a vehicle in the parking lot to move from a current position to a predetermined target position in the parking lot based on a monitoring result of the monitoring device; and
   a contact determination unit configured to perform a contact determination between the vehicle in the automatic drive control and an obstacle, based on the monitoring result or a detection result of a sensor mounted in the vehicle,
   wherein, in a case where the contact determination is performed by the contact determination unit, the automatic drive unit causes the vehicle to stop, and
   wherein, after the vehicle stops, the automatic drive unit causes the vehicle to move to a removal position and to be parked using the automatic drive control, and the removal position is determined based on the monitoring result or the detection result.

2. The automatic parking system according to claim 1, wherein, in a case where the contact determination is performed by the contact determination unit during the automatic drive control of the vehicle from the parking space in which the vehicle was parked to the target position, and in the case where a predetermined removal position indeterminable condition is satisfied, the automatic drive unit causes the vehicle to move to the parking space in which the vehicle was parked or to the target position and to be parked using the automatic drive control.

3. The automatic parking system according to claim 1, further comprising:
   a door lock control unit configured to control a door lock state of the vehicle,
   wherein the automatic drive unit makes the door lock state of the vehicle be in a locked state via the door lock control unit in a case where the automatic drive control is performed on the vehicle, and makes the door lock state of the vehicle be in an unlocked state via the door lock control unit in a case where the vehicle is parked after the contact determination is performed by the contact determination unit.

4. The automatic parking system according to claim 2, further comprising:
   a door lock control unit configured to control a door lock state of the vehicle,
   wherein the automatic drive unit makes the door lock state of the vehicle be in a locked state via the door lock control unit in a case where the automatic drive control is performed on the vehicle, and makes the door lock state of the vehicle be in an unlocked state via the door lock control unit in a case where the vehicle is parked after the contact determination is performed by the contact determination unit.

* * * * *